United States Patent
Gray

(10) Patent No.: US 9,459,903 B2
(45) Date of Patent: Oct. 4, 2016

(54) TECHNIQUES FOR ROUTING SERVICE CHAIN FLOW PACKETS BETWEEN VIRTUAL MACHINES

(71) Applicant: INTEL CORPORATION, Santa Clara, CA (US)

(72) Inventor: Mark D. Gray, Shannon (IE)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/494,912

(22) Filed: Sep. 24, 2014

(65) Prior Publication Data

US 2016/0085577 A1   Mar. 24, 2016

(51) Int. Cl.
G06F 9/455       (2006.01)

(52) U.S. Cl.
CPC . *G06F 9/45558* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 2007/0243934 A1* | 10/2007 | Little | G07F 17/32 463/40 |
| 2012/0207174 A1 | 8/2012 | Shieh et al. | |
| 2012/0284513 A1* | 11/2012 | Yerli | G06F 21/53 713/168 |
| 2014/0153575 A1 | 6/2014 | Munoz | |
| 2014/0376555 A1* | 12/2014 | Choi | H04L 45/66 370/395.53 |

OTHER PUBLICATIONS

Partial European Search Report received for European Patent Application No. 15181474.6, mailed Feb. 9, 2016, 6 pages.

* cited by examiner

*Primary Examiner* — Craig Dorais

(57) ABSTRACT

Examples may include a host computing platform having a multi-core processor capable of supporting a host operating system and a plurality of virtual machines (VMs). Support may include processing elements or cores for the multi-core processor being capable of separately supporting individual VMs. The individual VMs may be capable of executing separate applications used to process packets for a service chain flow. In some examples, techniques for routing the packets for the service chain flow between the individual VMs may include distributing at least some switch logic between the individual VMs.

21 Claims, 10 Drawing Sheets

Storage Medium 600

Computer Executable Instructions for 500

RECEIVE, AT A HOST O/S SUPPORTED BY A FIRST PROCESSING ELEMENTS OF A MULTI-CORE PROCESSOR, A REQUEST TO CONFIGURE A VIRTUAL SWITCH USED TO ROUTE PACKETS FOR A SERVICE CHAIN FLOW BETWEEN FIRST AND SECOND VMS SEPARATELY SUPPORTED BY RESPECTIVE SECOND AND THIRD PROCESSING ELEMENTS OF THE MULTI-CORE PROCESSOR, CONFIGURING THE VIRTUAL SWITCH TO INCLUDE

GENERATING A GLOBAL FLOW TABLE TO INDICATE A ROUTE THE PACKETS FOR THE SERVICE FLOW ARE TO FOLLOW FOR PROCESSING BY SEPARATE APPLICATIONS EXECUTED BY THE FIRST AND SECOND VMS
*804*

PARTITIONING THE GLOBAL FLOW TABLE INTO FIRST AND SECOND FLOW TABLES FOR RESPECTIVE USE BY THE FIRST AND SECOND VMS TO ROUTE THE PACKETS FOR THE SERVICE CHAIN FLOW FOLLOWING SEPARATE PROCESSING BY THE SEPARATE APPLICATIONS
*806*

INDICATING THE FIRST AND SECOND FLOW TABLES TO THE FIRST AND SECOND VMS
*808*

*802*

PROVIDE ONLY THE GLOBAL FLOW TABLE TO THE REQUESTOR TO INDICATE CONFIGURATION OF THE VIRTUAL SWITCH
*810*

FIG. 8

Storage Medium 900

Computer Executable Instructions for 800

FIG. 9

(12)United States Patent
US 9,459,903 B2

TECHNIQUES FOR ROUTING SERVICE CHAIN FLOW PACKETS BETWEEN VIRTUAL MACHINES

TECHNICAL FIELD

Examples described herein are generally related to routing packets for processing by applications executed by virtual machines.

BACKGROUND

Computing platforms that may include network servers coupled with client computing devices are increasing being arranged to support or host virtual machine(s) (VMs) that enable multiple operating systems and/or applications to be executed by a single computing platform including one or more multi-core processors. Processing elements or cores of a multi-core processor may be capable of supporting a plurality of VMs. Each VM may be capable of separately executing at least one application. In some examples, network servers may be arranged to provide a set of network services, such as load balancers, firewalls or intrusion detection systems. In some cases, the set of network services may be referred to as a service chain. VMs capable of separately executing an application may be arranged to process network packets received from a client according to a service chain flow.

Software virtual switches arranged to route packets for a service chain flow between VMs are becoming increasingly more common. Current virtual switching technologies such as those described by one or more industry standards or specifications including the OpenFlow Switch Specification, version 1.3.4, published in March 2014, and/or later versions of this standard may rely on one virtual switch application running or executing on a host operating system to switch packets for the service chain flow between the VMs. In a network function virtualization (NFV) deployment, multiple threads may be dedicated to virtual switching. These threads may be affinitized to multiple cores of a multi-core processor that are then primarily or entirely used for switching packets for the service chain flow between the VMs.

BRIEF DESCRIPTION OF THE DRAWINGS

FIG. 6 illustrates an example of a first storage medium.
FIG. 8 illustrates an example of a second logic flow.
FIG. 9 illustrates an example of a second storage medium.

DETAILED DESCRIPTION

Figure 1:
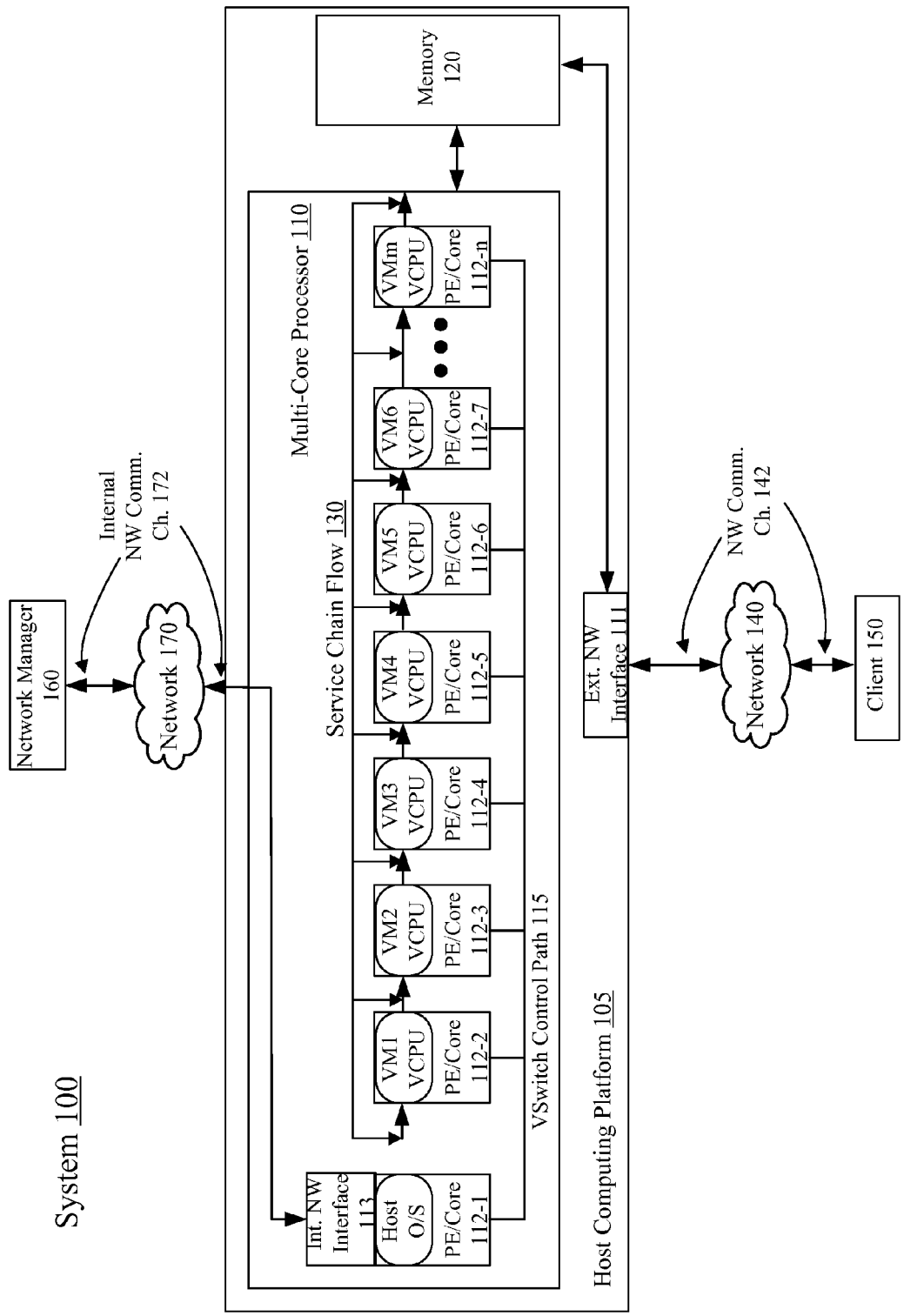
FIG. 1 illustrates an example first system.

As contemplated in the present disclosure, an NFV deployment may result in multiple physical cores of a multi-core processor being dedicated for switching packets for the service chain flow between the VMs. Dedicating multiple physical cores may be problematic for at least two reasons. First, when multiple cores are dedicated to a software virtual switch, these cores may become a bottleneck, particularly at high packet rates typical in NFV deployments. Potential bottlenecks may limit possible expansions of a service chain to include additional services. Bottlenecks may lead to unacceptable switching latencies and/or throughputs during peak packet traffic periods and thus links in a service chain may be limited to avoid unacceptable switching latencies or performance. Second, every packet for a service chain flow received by a virtual switch needs to be classified. This need for classification can make the virtual switch even more of a bottleneck when routing packets for a service chain flow. For example, an example service chain flow serviced by applications executed by five different VMs may have packets that traverse through the five different VMs for processing by the applications. Traversing through the five different VMs may result in the service chain flow also traversing the virtual switch six times.

Some attempts have been made to limit effects of a bottlenecked software virtual switch such as allowing threads to be scheduled freely across cores, several threads sharing a core or allowing creation of new threads. However, due to overhead associated with thread scheduling, performance may suffer. Another option to limit effects may be to chain a number of VMs together in a fixed path. This option would remove the need for a virtual switch but would also remove an ability to control a path for a service chain flow through the VMs. This may reduce flexibility in a likely dynamic environment that may see fluctuations in service types and workloads associated with a given service chain. It is with respect to these challenges that the examples described herein are needed.

According to some first examples, techniques for routing service chain flow packets between VMs may include receiving, at a host operating system supported by a first processing element of a multi-core processor, a request to configure a virtual switch used to route packets for a service chain flow between first and second VMs separately supported by respective second and third processing elements of the multi-core processor. For these first examples, configuring the virtual switch may include generating a global flow table to indicate a route the packets for the service flow are to follow for processing by separate applications executed by the first and second VMs. Configuring the virtual switch may also include partitioning the global flow table into first and second flow tables for respective use by the first and second VMs to route the packets for the service chain flow following separate processing by the separate applications. Configuring the virtual switch may also include indicating the first and second flow tables to the first and second VMs. The global flow table may then be provided only to the requestor to indicate configuration of the virtual switch.

In some second examples, techniques for routing service chain flow packets between VMs may include receiving, at a first VM supported by a first processing element of a multi-core processor, a packet for a service chain flow that is to be processed by a first application executed by the first VM. The techniques may also include accessing a first flow table from among a plurality of flow tables, the first flow table for use by the first VM to route the packet following service chain processing by the first application. The techniques may also include determining to route the packet for additional service chain processing to a second VM supported by a second processing element of the multi-core processor. The techniques may also include sending a message to the second VM that includes a first reference to a first location in a memory shared between the first and second VMs for the second VM to receive the packet for the additional service chain processing by a second application executed by the second VM.

FIG. 1 illustrates an example first system. In some examples, as shown in FIG. 1, the first example system includes system 100. System 100 includes a host computing platform 105 having a multi-core processor 110 that includes a plurality of processing elements (PEs)/cores 112-1 to 112-$n$, where "n" is any positive whole integer greater than 1. According to some examples, PEs/Cores 112-1 to 112-$n$ may be capable of or arranged to separately support VMs that are shown in FIG. 1 as VM1 to VMm, where m=n−1. Also, each PE/Core may be capable of supporting a host operating system (O/S) (such as PE/Core 112-1). Each VM may be arranged to have a virtual central processing unit (VCPU) that may execute or run one or more applications (e.g., VM1-VMm).

According to some examples, a VM may be a software implementation of a machine such as a computer that may execute programs or applications similar to a physical machine. VMs may be separated into two example classes that may be based on usage and degree of correspondence to a real machine. A first example class may be a system VM. A system VM may provide a complete system platform which supports execution of a complete O/S. System VMs may emulate an existing architecture and may be built with a purpose of either providing a platform to run programs/applications in instances where real hardware may not be available for use (e.g., executing on otherwise obsolete platforms), or of having multiple instances of virtual machines for more efficient use of computing resources. A system VM may also be based on a technology called Containers that allows for multiple isolated user space instances referred to as "containers" that virtualize a server to appear as a real server from a point of view of a user or client. A second example class may be a process VM. A process VM may be designed to run a single program/application and/or support a single process.

In some examples, as shown in FIG. 1, host computing platform 105 may be coupled to a client 150 via a network (NW) communication channel 142 routed through network 140. An external NW interface 111 may be capable of receiving network packets via NW comm. channel 142 for eventual processing by one or more applications executed by VM1 to VMm supported by PE/cores 112-2 to 112-$n$. Memory 120, for example, may be arranged to at least temporarily maintain at least portions of these packets after receiving and/or following processing by the one or more applications executed by VM1 to VMm. According to some examples, host computing platform 105 may be located in a data center or server farm arranged to provide network services to clients such as client 150.

In some examples, as shown in FIG. 1, a network manager 160 may couple to host computing platform 105 via an internal NW communication channel 172 routed through network 170. According to some examples, internal NW communication channel 172 may couple to a PE/core arranged to support a host O/S through an internal NW interface at computing platform 105. For example, as shown in FIG. 1, PE/core 112-1 may support the host O/S and may be coupled to internal NW communication channel 172 through internal network interface 113.

As described more below, a network manager such as network manager 160 may be able to send a request to configure a virtual switch used to route packets for a service chain flow between VMs (e.g., VM1 to VMm) such as service chain flow 130. The request may be sent via an internal NW communication channel such as internal NW communication channel 172 and received by a host O/S supported by a PE/core of multi-core processor 110 such as PE/core 112-1. The request may be received through an internal NW interface such as internal NW interface 113. Also, a virtual switch (VSwitch) control path such as VSwitch control path 115 may be established between the host O/S and each VM executing an application to process packets for service chain flow 130.

According to some examples, as described more below, the configuration of the virtual switch used to route packets for a service chain flow may include a distribution of virtual switch logic between VMs that enables routing of a packet for a service chain flow following service chain processing by applications separately executed by the VMs. The distribution of the virtual switch logic may include generating a global flow table and then partitioning the global flow table into separate flow tables to be used by respective VMs to route packets for the service chain flow following separate processing by the applications being executed by the VMs. For these examples, a requestor (e.g., network manager 160) may only see or have access to the global flow table. Meanwhile, the VMs executing the applications to process the packet for the service chain flow may only see or have access to their respective flow tables that were partitioned from the global flow table.

In some examples, a service chain flow may be for an e-mail service chain, a streaming video service chain, a streaming audio service chain, a service provider service chain, a network storage service chain, a social network service chain or a network security service chain. Examples are not limited to only these types of service chains, other types are contemplated. Also, for these examples, applications separately executed by VMs supported by PEs/cores of a multi-core processor may each be arranged to process a packet for the service chain flow. Depending on the type of service chain, each application may process the packet to perform a particular network service. For example, an e-mail service chain may include network services such as virus, spam detection or phishing detection. A service provider service chain, for example, may include network services for deep packet inspection or traffic modeling.

Figure 2:
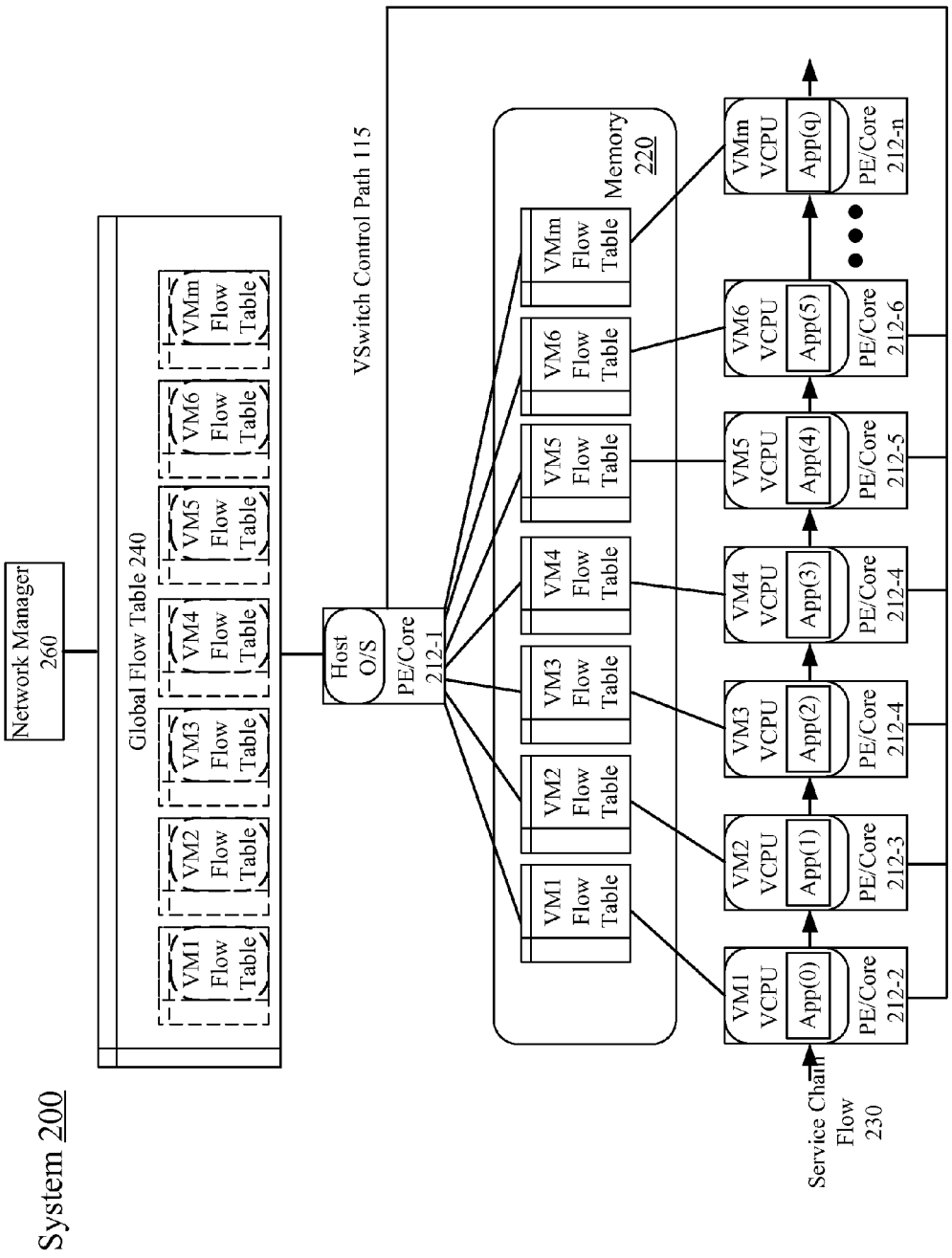
FIG. 2 illustrates example second system.

FIG. 2 illustrates an example second system. As shown in FIG. 2, the example second system includes system 200. In some examples, system 200 may include PEs/cores 212-1 to 212-$n$ that may be part of a multi-core processor similar to multi-core processor 110 shown in FIG. 1. For these examples, as shown in FIG. 2, PE/core 212-1 supports a host O/S while PEs/Cores 212-2 to 212-$n$ support VMs identified as VM1 to VMm. VM1 to VMm may be capable of executing respective applications (Apps) 0 to q, where "q" equals any whole positive integer greater than 5.

According to some examples, network manager 260 may include means for a user to configure a virtual switch (e.g., a keyboard/touch screen with a display) via a request sent to and processed by the host O/S supported by PE/core 212-1. The request may be to configure the virtual switch to route packets for service chain flow 230 between VMs VM1 to VMm for processing by respective App(0) to App(q). For these examples, configuring the virtual switch may include generating a global flow table 240 that indicates to the user or requestor a route the packets for the service flow may follow for processing by applications App(0) to App(q) executed by respective VMs VM1 to VMm. Configuring the virtual switch may also include partitioning global flow table 240 into separate flow tables for each VM of VM1 to VMm and then indicating these separate flow tables to respective VMs VM1 to VMm. By each VM being capable of executing at least a portion of virtual switch logic it may be possible to avoid expending host O/S and/or PE/core 212-1 resources for switching. This avoidance of switching may free up PE/core resources.

In some examples, as shown in FIG. 2, a VSwitch control path 115 may couple the host O/S with VMs VM1 to VMm executing respective applications App(0) to App(q). For these examples, logic and/or features of the host O/S and/or PE/core 212-1 may be capable of indicating the separate flow tables via VSwitch control path 115. Indicating, for example, may include providing memory address ranges in a memory 220 arranged to maintain the respective flow tables partitioned from global flow table 240. For these examples, by providing individual flow tables for use by VM1 to VMm, each VM may be capable of executing at least a portion of virtual switch logic to route packets for service chain flow 230 between VMs configured to execute applications that process these packets.

According to some examples, each VM's flow table may include source address information (e.g., a source media access control (MAC) address) to indicate where packets for service chain flow 230 may be received. Each VM's flow table may also indicate destination address information (e.g., a destination MAC address) to indicate where packets for service chain flow 230 may be routed following processing by applications executed by a particular VM.

Figure 3:
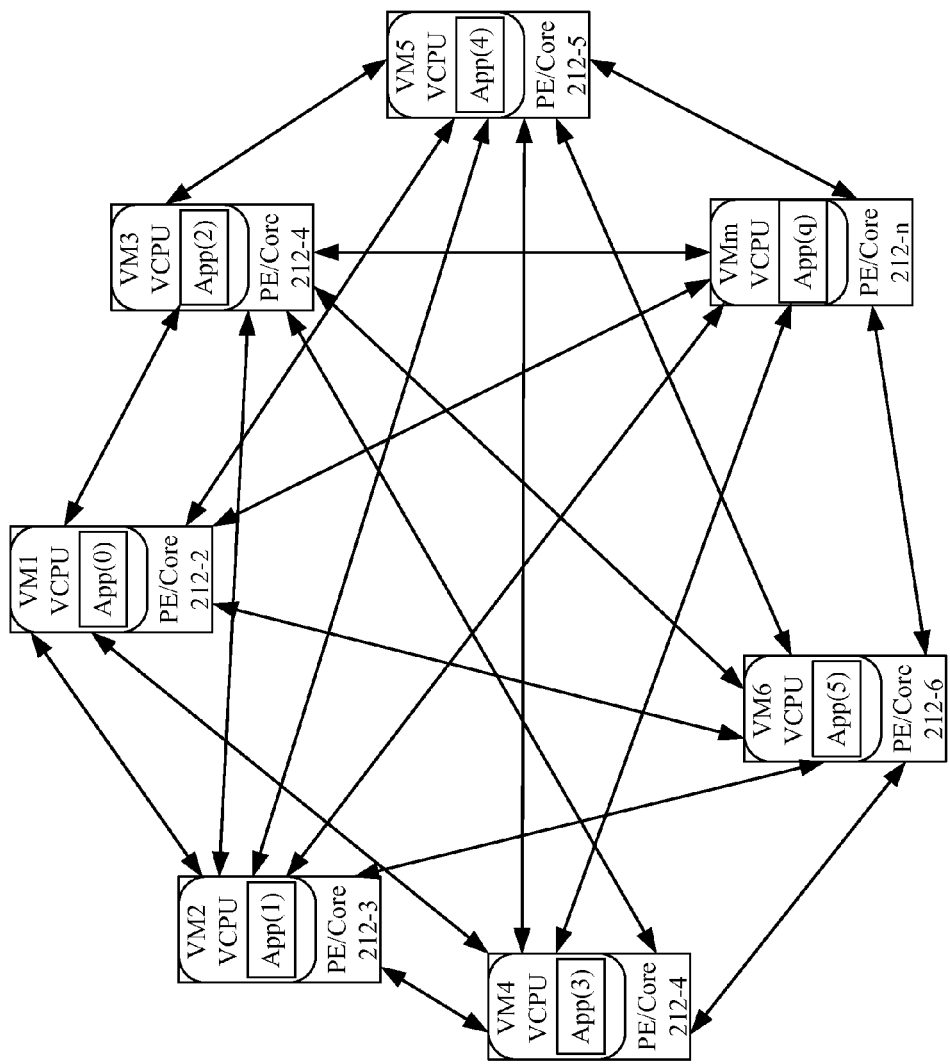
FIG. 3 illustrates an example shared memory mesh.

FIG. 3 illustrates an example shared memory mesh 300. As shown in FIG. 3, shared memory mesh 300 shows PEs/cores 212-2 to 212-n coupled together to form a shared memory mesh 300. According to some examples, shared memory mesh 300 may include a shared memory ring (e.g., dynamic random access memory (DRAM)) that is capable of allowing each VM from among VM1 to VMm to receive packets for a service chain such as those for service chain flow 230 shown in FIG. 2. For these examples, the packets may be received in a zero-copy manner. For example, following processing by App(0) at PE/core 212-2, VM1 may include logic and/or features to first use VM1's flow table to send a message to VM2 (destination VM) that indicates a location in a shared memory where one or more packets for service chain flow 230 have been stored following processing by App(0). Since an indication of the location in the shared memory is provided rather than copying the one or more packets to a buffer or memory assigned to App(1) being executed by VM2, the one or more packets may be received by VM2 in a zero-copy manner.

Figure 4:
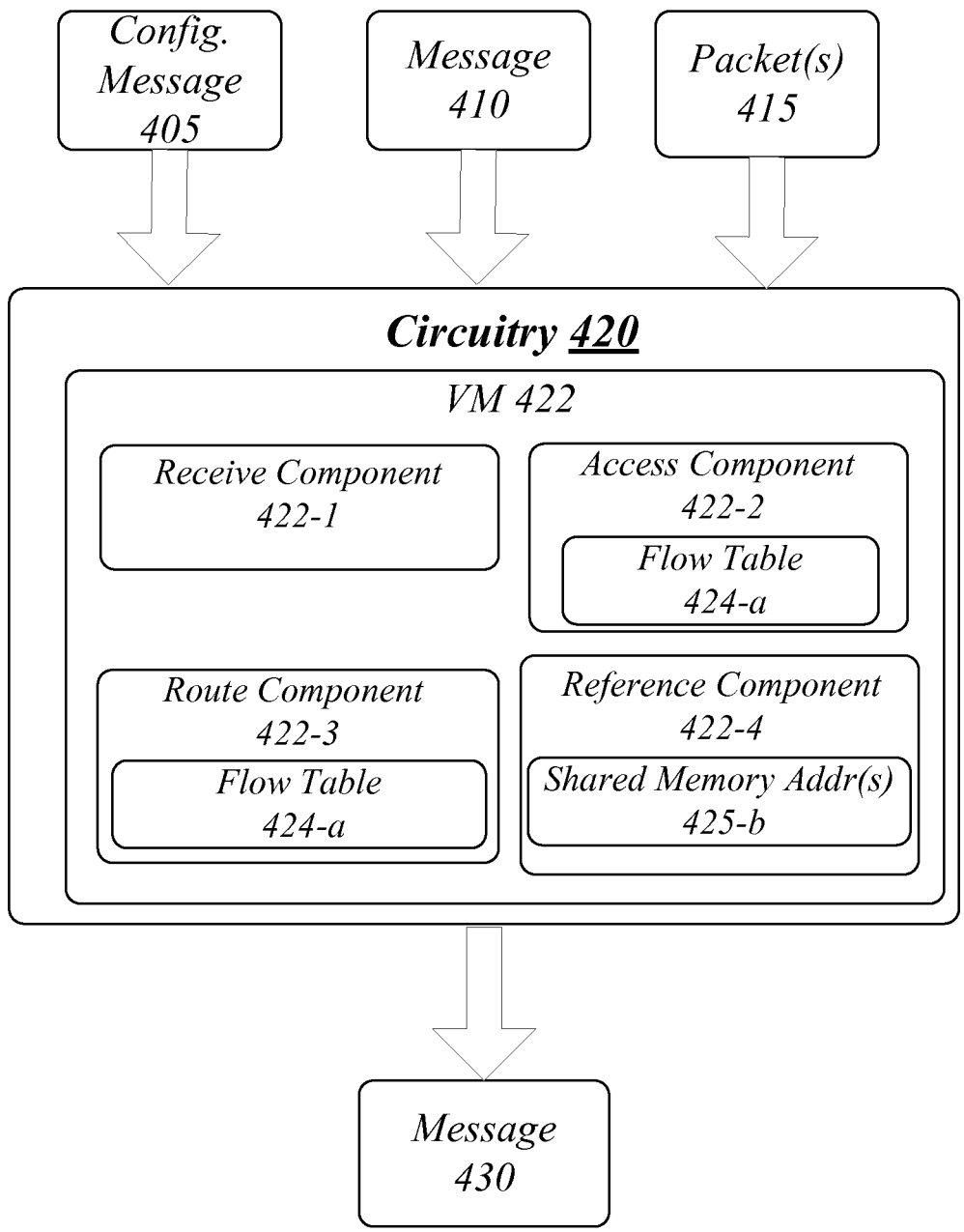
FIG. 4 illustrates an example block diagram for a first apparatus.

FIG. 4 illustrates an example block diagram for a first apparatus. As shown in FIG. 4, the first apparatus includes an apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may be supported by circuitry 420 that may be a PE/core of a multicore processor maintained at a host computing platform. Circuitry 420 may be arranged to support a VM 422 capable of executing one or more software or firmware implemented modules or components 422-a. It is worthy to note that "a" and "b" and "c" and similar designators as used herein are intended to be variables representing any positive integer. Thus, for example, if an implementation sets a value for a=4, then a complete set of software or firmware for components 422-a may include components 422-1, 422-2, 422-3 or 422-4. The examples presented are not limited in this context and the different variables used throughout may represent the same or different integer values.

According to some examples, circuitry 420 may be a PE/core of a multicore processor that is from any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors.

According to some examples, apparatus 400 may include a receive component 422-1. Receive component 422-1 may be executed by VM 422 supported by circuitry 420. For these examples, receive component 422-1 may receive a packet for a service chain flow that is to be processed by an application also executed by the VM. The packet, for example, may be included in packet(s) 415. Receive component 422-1 may receive the packet via use of a first message included in message 410 that has a first reference to a first location in a memory shared with other VMs that at least temporarily stores at least portions of the packet to be processed by the application executed by the VM.

According to some examples, apparatus 400 may include an access component 422-2. Access component 422-2 may be executed by the VM 422 supported by circuitry 420. For these examples, access component 422-2 may access a flow table from among a plurality of flow tables to route the packet following processing by the application executed by the VM. The plurality of flow tables may be separate flow tables partitioned from a global flow table for use by respective VMs to route packets for the service chain flow. The flow table may be maintained by access component 422-2 in flow table 425-b (e.g., in a lookup table (LUT)).

In some examples, the flow table to be accessed may have been communicated via a second message included in configuration message 405. For these examples, access component 422-2 may have received the second message from an O/S executed by a different VM following a configuration of a virtual switch. The configuration of the virtual switch may have distributed a portion of switch logic to the VM to route packets for the service chain flow between the VM and at least one other VM.

According to some examples, apparatus 400 may include a route component 422-3. Route component 422-3 may be executed by the VM 422 supported by circuitry 420. For these examples, route component 422-3 may use the flow table maintained in flow table 425-b to route the packet following service chain processing to another VM supported by another PE/core of the multi-core processor that includes circuitry 420. The other VM may execute another application that may perform additional service chain processing.

In some examples, apparatus 400 may include a reference component 422-4. Reference component 422-4 may be executed by the VM 422 supported by circuitry 420. For these examples, reference component 422-4 may send a third message to the other VM that includes a second reference to a second location in the memory shared between the VM and the other VMs. The other VM may then be use the second location to receive the packet from the memory and enable the other application to perform additional service chain processing. Message 430 may include the third message sent to the other VM that includes the second reference to the second location.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
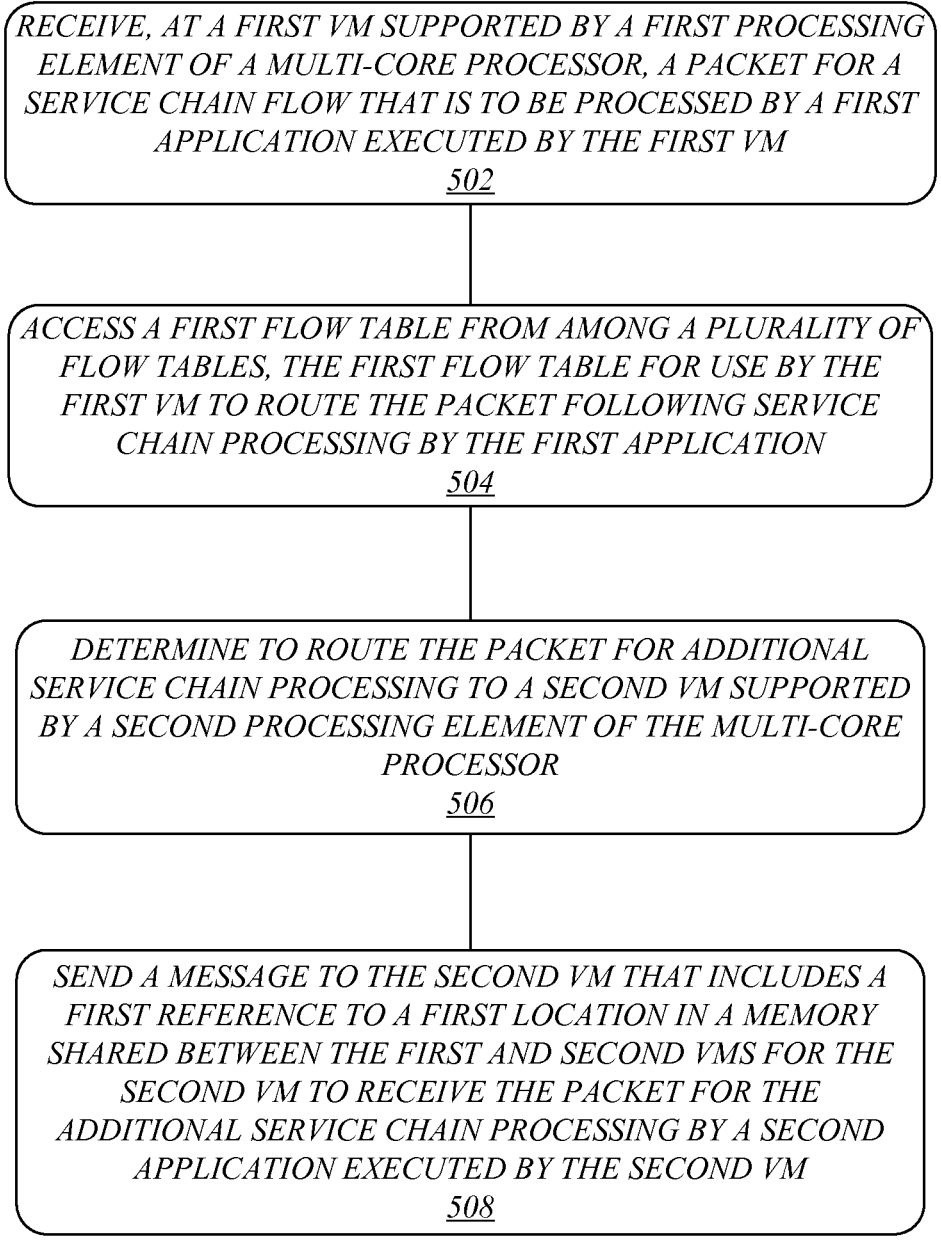
FIG. 5 illustrates an example of a first logic flow.

FIG. 5 illustrates an example of a first logic flow. As shown in FIG. 5 the first logic flow includes a logic flow 500. Logic flow 500 may be representative of some or all of the operations executed by one or more logic, features, or devices described herein, such as apparatus 400. More particularly, logic flow 500 may be implemented by at least receive component 422-1, access component 422-2, route component 422-3 or reference component 422-4.

According to some examples, logic flow 500 at block 502 may receive, at a first VM supported by a first PE/core of a multi-core processor (e.g., circuitry 420), a packet for a service chain flow that is to be processed by a first application executed by the first VM. For these examples, receive component 422-1 may receive the packet.

In some examples, logic flow 500 at block 504 may access a first flow table from among a plurality of flow tables, the first flow table for use by the first VM to route the packet following service chain processing by the first application. For these examples, access component 422-2 may access the first flow table.

According to some examples, logic flow 500 at block 506 may determine to route the packet for additional service chain processing to a second VM supported by a second processing element of the multi-core processor. For these examples, route component 422-3 may use the first flow table to determine the second VM to route the packet for additional service chain processing.

According to some examples, logic flow 500 at block 508 may send a message to the second VM that includes a first reference to a first location in a memory shared between the first and second VMs for the second VM to receive the packet for the additional service chain processing by a second application executed by the second VM. For these examples, reference component 422-4 may send or cause the sending of the message to the second VM.

FIG. 6 illustrates an example of a first storage medium. As shown in FIG. 6, the first storage medium includes a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
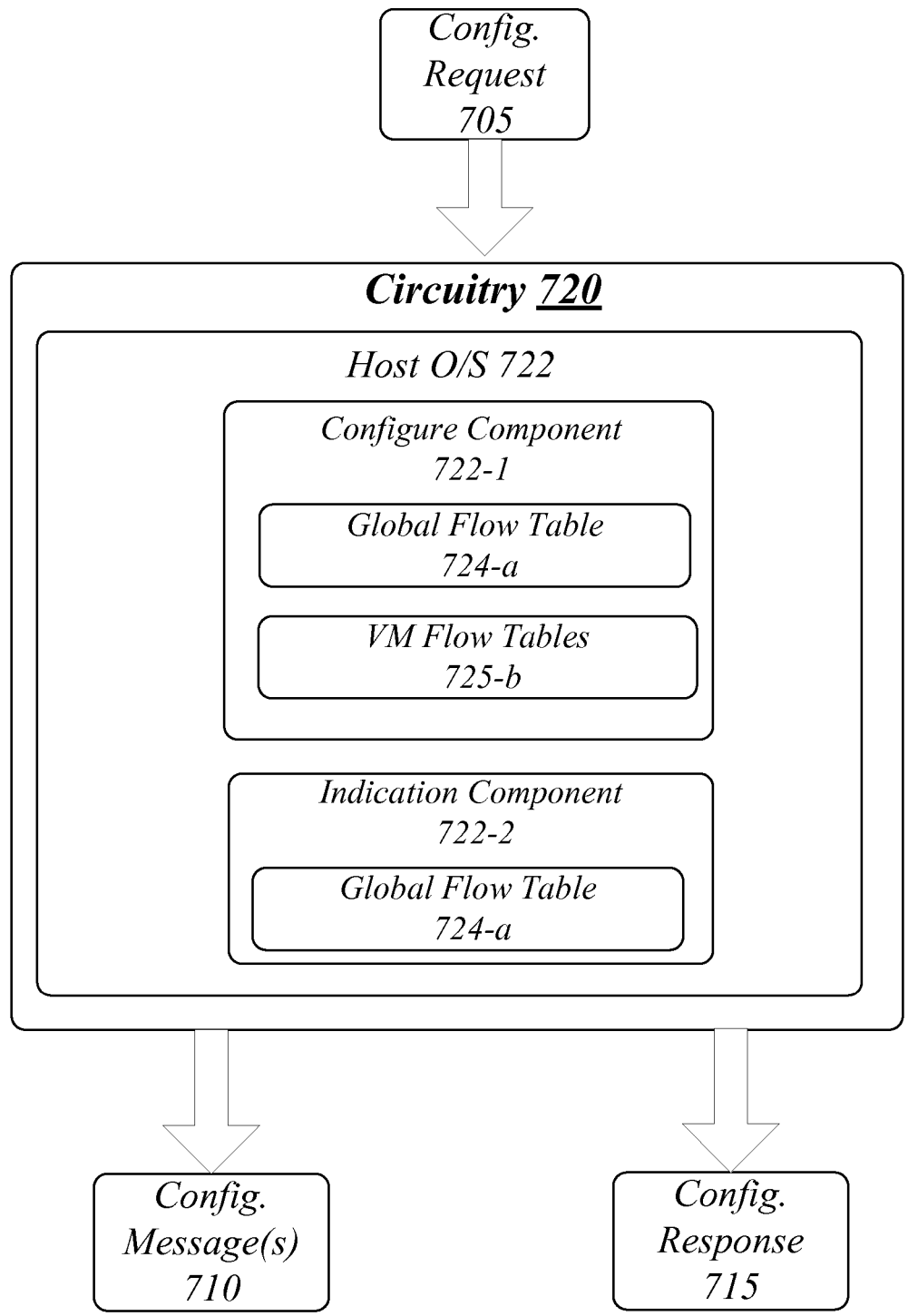
FIG. 7 illustrates an example block diagram for a second apparatus.

FIG. 7 illustrates an example block diagram for a second apparatus. As shown in FIG. 7, the first apparatus includes an apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may include circuitry 720 that may be a PE/core of a multicore processor maintained at a host computing platform. Circuitry 720 may be arranged to support a host O/S 722 that may be capable of executing one or more software or firmware implemented modules or components 722-a. It is worthy to note that "a" and "b" and "c" and similar designators as used herein are intended to be variables representing any positive integer. Thus, for example, if an implementation sets a value for a=2, then a complete set of software or firmware for components 722-a may include components 722-1 or 722-2. The examples presented are not limited in this context and the different variables used throughout may represent the same or different integer values.

In some examples, circuitry 720 may be a PE/core of a multicore processor that is from any of various commercially available processors to include, but not limited to, the processor mentioned above for apparatus 400.

According to some examples, apparatus 700 may include a configure component 722-1. Configure component 722-1 may be executed by host O/S 722 supported by circuitry 720. For these examples, configure component 722-1 may receive a request to configure a virtual switch used to route packets for a service chain flow between two VMs such as between a first and a second VM from among the plurality of VMs. These first and second VMs may be separately supported by other circuitry (e.g., other PEs/cores) of the multicore processor. The request may be included in configuration request 705.

In some examples, configure component 722-1 may configure the virtual switch by first generating a global flow table to indicate a route the packets for the service flow are to follow for processing the separate applications executed by the first and second VMs. The global flow table may be maintained at or with global flow table 724-a (e.g., in an LUT). Configure component 722-1 may then partition the global flow table into first and second flow tables for respective use by the first and second VMs to route the packets for the service chain flow following separate processing by the separate applications. For these examples, the first and second flow tables may be maintained in or with VM flow tables 725-b (e.g., in an LUT). Configure component 722-1 may then indicate the first and second flow tables to the first and second VMs by sending a respective memory range in separate configuration messages to the first and second VMs. These separate configuration messages may be included in configuration message(s) 710.

According to some examples, apparatus 700 may include an indication component 722-2. Indication component 722-2 may be executed by host O/S 722 supported by circuitry 720. For these examples, access component 722-2 may provide only the global flow table to the requestor to indicate configuration of the virtual switch. Indication component 722-2, for example, may send a copy of the global flow table maintained in global flow table 724-*a* or allow the requestor to have access to a stored version of the global flow table maintained in global flow table 724-*a*. The copy of the global flow table or information to access the global flow table may be included in configuration response message 715.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates an example of a second logic flow. As shown in FIG. 8 the first logic flow includes a logic flow 800. Logic flow 800 may be representative of some or all of the operations executed by one or more logic, features, or devices described herein, such as apparatus 700. More particularly, logic flow 800 may be implemented by at least configure component 722-1 or indication component 422-2.

According to some examples, logic flow 800 at block 802 may receive, at a host O/S supported by a first PE/core of a multi-core processor (e.g. circuitry 720), a request to configure a virtual switch used to route packets for a service chain flow between first and second VMs separately supported by respective second and third processing elements of the multi-core processor. For these examples, configure component 722-1 may receive the request.

In some examples, logic flow 800 for configuring the switch may include logic flow 800 at block 804 generating a global flow table to indicate a route the packets for the service flow are to follow for processing by separate applications executed by the first and second VMs. At block 806 configuring the switch may also include partitioning the global flow table into first and second flow tables for respective use by the first and second VMs to route the packets for the service chain flow following separate processing by the separate applications. At block 808 configuring the switch may also include indicating the first and second flow tables to the first and second VMs. For these examples, configure component 722-1 may configure the virtual switch as mentioned above for blocks 804 to 808.

According to some examples, logic flow 800 at block 810 may provide only the global flow table to the requestor to indicate configuration of the virtual switch. For these examples, indication component 722-2 may provide the global flow table to the requestor.

FIG. 9 illustrates an example of a second storage medium. As shown in FIG. 9, the first storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
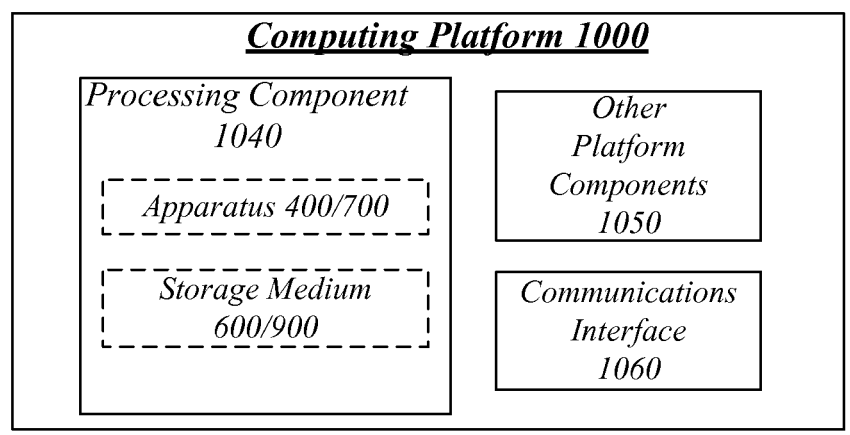
FIG. 10 illustrates an example computing platform.

FIG. 10 illustrates an example computing platform 1000. In some examples, as shown in FIG. 10, computing platform 1000 may include a processing component 1040, other platform components or a communications interface 1060. According to some examples, computing platform 1000 may be implemented in a host computing platform such as host computing platform 105 shown in FIG. 1.

According to some examples, processing component 1040 may execute processing operations or logic for apparatus 400/700 and/or storage medium 600/900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

As mentioned above, computing platform 1000 may be implemented in a host computing platform. Accordingly, functions and/or specific configurations of computing platform 1000 described herein, may be included or omitted in various embodiments of computing platform 1000, as suitably desired for a server or client computing device.

The components and features of computing platform 1000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include a multi-core processor having a first processing element to support a first VM and a second processing element to support a second VM. The apparatus may also include a receive component for execution by the first VM to receive a packet for a service chain flow that is to be processed by a first application also executed by the first VM. The apparatus may also include an access component for execution by the first VM to access a first flow table from among a plurality of flow tables. The apparatus may also include a route component for execution by the first VM to use the first flow table to route the packet following service chain processing by the first application to the second VM for additional service chain processing by a second application executed by the second VM. The apparatus may also include a reference component for execution by the first VM to send a message to the second VM that includes a first reference to a first location in a memory shared between the first and second VMs for the second VM to receive the packet.

Example 2

The apparatus of example 1, the receive component may receive the packet from a third VM by receiving a second message that includes a second reference to a second location in the memory shared between the first, second and third VMs.

Example 3

The apparatus of example 2, the first location and the second location may be a same memory address for the memory shared between the first, second and third VMs.

Example 4

The apparatus of example 2, the memory shared between the first, second and third VMs may include a shared memory ring producing a shared memory mesh capable of allowing the first, second and third VMs to receive the packet for service chain processing in a zero-copy manner.

Example 5

The apparatus of example 1, the service chain flow may be for an e-mail service chain, a streaming video service chain, a streaming audio service chain, a service provider service chain, a network storage service chain, a social network service chain or a network security service chain.

Example 6

The apparatus of example 1, the plurality of flow tables may be arranged to be indicated as a single flow table to a user that has requested configuration of a virtual switch to route packets for the service chain flow between at least the first and second VMs.

Example 7

The apparatus of example 6, the first flow table may be from among the plurality of flow tables assigned to the first VM based on a configuration of the virtual switch that distributes a portion of switch logic to the first VM to route packets for the service chain flow between at least the first and second VMs.

Example 8

The apparatus of example 7, a fourth processing element of the multi-core processor may support a host operating system having a virtual switch control path to communicate distribution of the portion of switch logic to the first VM to configure the virtual switch.

Example 9

The apparatus of example 1 may also include a digital display coupled to the circuitry to present a user interface view.

Example 10

An example method may include receiving, at a first VM supported by a first processing element of a multi-core processor, a packet for a service chain flow that is to be processed by a first application executed by the first VM. The method may also include accessing a first flow table from among a plurality of flow tables. The first flow table may be for use by the first VM to route the packet following service chain processing by the first application. The method may also include determining to route the packet for additional service chain processing to a second VM supported by a second processing element of the multi-core processor. The method may also include sending a message to the second VM that includes a first reference to a first location in a memory shared between the first and second VMs for the second VM to receive the packet for the additional service chain processing by a second application executed by the second VM.

Example 11

The method of example 10 may also include receiving the packet from a third VM by receiving a second message that includes a second reference to a second location in the memory shared between the first, second and third VMs.

Example 12

The method of example 11, the first location and the second location may be a same memory address for the memory shared between the first, second and third VMs.

Example 13

The method of example 11, the memory shared between the first, second and third VMs may include a shared memory ring producing a shared memory mesh capable of allowing the first, second and third VMs to receive the packet for processing in a zero-copy manner.

Example 14

The method of example 10, the service chain flow may be for an e-mail service chain, a streaming video service chain, a streaming audio service chain, a service provider service chain, a network storage service chain, a social network service chain or a network security service chain.

Example 15

The method of example 10, the plurality of flow tables may be indicated as a single flow table to a user that has requested configuration of a virtual switch to route packets for the service chain flow between at least the first and second VMs.

Example 16

The method of example 15, the first flow table may be from among the plurality of flow tables assigned to the first VM based on a configuration of the virtual switch that distributes a portion of switch logic to the first VM to route packets for the service chain flow between at least the first and second VMs.

Example 17

The method of example 16, a fourth processing element of the multi-core processor may support a host operating system having a virtual switch control path to communicate distribution of the portion of switch logic to the first VM to configure the virtual switch.

Example 18

At least one machine readable medium may include a plurality of instructions that in response to being executed by system at a host computing platform having a multi-core processor capable of supporting a plurality of VMs may cause the system to carry out a method according to any one of examples 10 to 17.

Example 19

An apparatus may include means for performing the methods of any one of examples 10 to 17.

Example 20

An example at least one machine readable medium may include a plurality of instructions that in response to being executed by a first VM supported by a first processing element of a multi-core processor may cause the first VM to receive a packet for a service chain flow that is to be processed by a first application executed by the first VM supported by a first processing element of a multi-core processor. The instructions may also cause the first VM to access a first flow table from among a plurality of flow tables. The instructions may also cause the first VM to use the first flow table to route the packet following service chain processing by the first application to a second VM supported by a second processing element of the multi-core processor for additional service chain processing by a second application executed by the second VM. The instructions may also cause the first VM to send a message to the second VM that includes a first reference to a first location in a memory shared between the first and second VMs for the second VM to receive the packet.

Example 21

The at least one machine readable medium of example 20, the instructions to may also cause the first VM to receive the packet from a third VM by receiving a second message that includes a second reference to a second location in the memory shared between the first, second and third VMs.

Example 22

The at least one machine readable medium of example 21, the first location and the second location may be a same memory address for the memory shared between the first, second and third VMs.

Example 23

The at least one machine readable medium of example 21, the memory shared between the first, second and third VMs may include a shared memory ring producing a shared memory mesh capable of allowing the first, second and third VMs to receive the packet for service chain processing in a zero-copy manner.

Example 24

The at least one machine readable medium of example 20, the service chain flow may be for an e-mail service chain, a streaming video service chain, a streaming audio service chain, a service provider service chain, a network storage service chain, a social network service chain or a network security service chain.

Example 25

The at least one machine readable medium of example 20, the plurality of flow tables may be arranged to be indicated as a single flow table to a user that has requested configuration of a virtual switch to route packets for the service chain flow between at least the first and second VMs.

Example 26

The at least one machine readable medium of example 25, the first flow table may be from among the plurality of flow tables assigned to the first VM based on a configuration of the virtual switch that distributes a portion of switch logic to the first VM to route packets for the service chain flow between at least the first and second VMs.

Example 27

The at least one machine readable medium of example 26, a fourth processing element of the multi-core processor may support a host operating system having a virtual switch control path to communicate distribution of the portion of switch logic to the first VM to configure the virtual switch.

Example 28

An example apparatus may include a multi-core processor having a first processing element to support a host operating system. The apparatus may also include a configure component for execution by the host operating system to receive a request to configure a virtual switch used to route packets for a service chain flow between first and second VMs separately supported by respective second and third processing elements of the multi-core processor. Configuring the virtual switch may include the configure component to generate a global flow table to indicate a route the packets for the service flow are to follow for processing by separate applications executed by the first and second VMs. Configuring the virtual switch may also include the configuration component to partition the global flow table into first and second flow tables for respective use by the first and second VMs to route the packets for the service chain flow following separate processing by the separate applications. Configuring the virtual switch may also include the configuration component to indicate the first and second flow tables to the first and second VMs. The apparatus may also include an indication component for execution by host operating system to provide only the global flow table to the requestor to indicate configuration of the virtual switch.

Example 29

The apparatus of example 28, the host operating system may have a virtual switch control path with the first and second VMs to indicate the first and second flow tables to the first and second VMs.

Example 30

The apparatus of example 28, the global flow table may be arranged to be maintained in a first memory. For this example, the configure component to indicate the first flow table to the first VM may include the configure component to provide a first memory address range of the first memory that maintains the first flow table. The indication component to indicate the second flow table to the second VM may include the indication component to provide a second memory address range of the memory that maintains the second flow table.

Example 31

The apparatus of example 30, the first VM and the second VM may be capable or routing the packets for the service flow in a zero-copy manner that includes the first VM sending a message to the second VM that includes a reference to a location in a second memory shared between the first and second VMs that allows the first VM to route the packets without copying.

Example 32

The apparatus of example 31, the second memory may include a shared memory ring producing a shared memory mesh.

Example 33

The apparatus of example 28, the service chain flow may be for an e-mail service chain, a streaming video service chain, a streaming audio service chain, a service provider service chain, a network storage service chain, a social network service chain or a network security service chain.

Example 34

The apparatus of example 28 may also include a digital display coupled to the processor circuit to present a user interface view.

Example 35

An example method may include receiving, at a host operating system supported by a first processing elements of a multi-core processor, a request to configure a virtual switch used to route packets for a service chain flow between first and second VMs separately supported by respective second and third processing elements of the multi-core processor. Configuring the virtual switch may include generating a global flow table to indicate a route the packets for the service flow are to follow for processing by separate applications executed by the first and second VMs. Configuring the virtual switch may also include partitioning the global flow table into first and second flow tables for respective use by the first and second VMs to route the packets for the service chain flow following separate processing by the separate applications. Configuring the virtual switch may also include indicating the first and second flow tables to the first and second VMs. The method may also include providing only the global flow table to the requestor to indicate configuration of the virtual switch.

Example 36

The method of example 35, the host operating system may have a virtual switch control path with the first and second VMs to indicate the first and second flow tables to the first and second VMs.

Example 37

The method of example 35, the global flow table may be arranged to be maintained in a first memory. For this example, indicating the first flow table to the first VM may include providing a first memory address range of the first memory that maintains the first flow table. Also, indicating the second flow table to the second VM may include providing a second memory address range of the memory that maintains the second flow table.

Example 38

The method of example 37, the first VM and the second VM may be capable of routing the packets for the service flow in a zero-copy manner that includes the first VM sending a message to the second VM that includes a reference to a location in a second memory shared between the first and second VMs that allows the first VM to route the packets without copying.

Example 39

The method of example 38, the second memory comprising a shared memory ring producing a shared memory mesh.

Example 40

The method of example 35, the service chain flow may be for an e-mail service chain, a streaming video service chain, a streaming audio service chain, a service provider service chain, a network storage service chain, a social network service chain or a network security service chain.

Example 41

An example at least one machine readable medium may include a plurality of instructions that in response to being executed by system at a host computing platform having a multi-core processor capable of supporting a host operating system and a plurality of VMs may cause the system to carry out a method according to any one of examples 35 to 40.

Example 42

An example apparatus may include means for performing the methods of any one of examples 35 to 40.

Example 43

An example at least one machine readable medium may include a plurality of instructions that in response to being executed by a host operating system supported by a first processing element of a multi-core processor may cause the host operating system to receive a request to configure a virtual switch used to route packets for a service chain flow between first and second VMs separately supported by respective second and third processing elements of the multi-core processor. For this example configuring the virtual switch may include the instructions to cause the operating system to generate a global flow table to indicate a route the packets for the service flow are to follow for processing by separate applications executed by the first and second VMs. Configuring the virtual switch may also include the instructions to cause the operating system to partition the global flow table into first and second flow tables for respective use by the first and second VMs to route the packets for the service chain flow following separate processing by the separate applications. Configuring the virtual switch may also include the instructions to cause the operating system to indicate the first and second flow tables to the first and second VMs. The instructions may also cause the host operating system to provide only the global flow table to the requestor to indicate configuration of the virtual switch.

Example 44

The at least one machine readable medium of example 43, the host operating system may have a virtual switch control path with the first and second VMs. The instructions may further cause the host operating system to indicate the first and second flow tables to the first and second VMs through the virtual control path.

Example 45

The at least one machine readable medium of example 43, the global flow table may be arranged to be maintained in a first memory. The instructions may further cause the host operating system to indicate the first flow table to the first VM by providing a first memory address range of the first memory that maintains the first flow table and indicate the second flow table to the second VM by providing a second memory address range of the memory that maintains the second flow table.

Example 46

The at least one machine readable medium of example 45, the first VM and the second VM may be capable or routing the packets for the service flow in a zero-copy manner that includes the first VM sending a message to the second VM that includes a reference to a location in a second memory shared between the first and second VMs that allows the first VM to route the packets without copying.

Example 47

The at least one machine readable medium of example 46, the second memory may include a shared memory ring producing a shared memory mesh.

Example 48

The at least one machine readable medium of example 43, the service chain flow may be for an e-mail service chain, a streaming video service chain, a streaming audio service chain, a service provider service chain, a network storage service chain, a social network service chain or a network security service chain.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a multi-core processor having a first processing element to support a first virtual machine (VM) and a second processing element to support a second VM;
   a receive component for execution by the first VM to receive a packet for a service chain flow that is to be processed by a first application also executed by the first VM;
   an access component for execution by the first VM to access a first flow table from among a plurality of flow tables;
   a route component for execution by the first VM to use the first flow table to route the packet following service chain processing by the first application to the second VM for additional service chain processing by a second application executed by the second VM; and
   a reference component for execution by the first VM to send a message to the second VM that includes a first reference to a first location in a memory shared between the first and second VMs for the second VM to receive the packet, the memory shared between the first and second VMs comprising a shared memory ring producing a shared memory mesh capable of allowing the first and second VMs to receive the packet for service chain processing in a zero-copy manner.

2. The apparatus of claim 1, the receive component to receive the packet from a third VM by receiving a second message that includes a second reference to a second location in the memory shared between the first, second and third VMs.

3. The apparatus of claim 2, the first location and the second location are a same memory address for the memory shared between the first, second and third VMs.

4. The apparatus of claim 1, the service chain flow is for an e-mail service chain, a streaming video service chain, a streaming audio service chain, a service provider service chain, a network storage service chain, a social network service chain or a network security service chain.

5. The apparatus of claim 1, the plurality of flow tables are arranged to be indicated as a single flow table to a user that has requested configuration of a virtual switch to route packets for the service chain flow between at least the first and second VMs.

6. The apparatus of claim 5, the first flow table from among the plurality of flow tables assigned to the first VM based on a configuration of the virtual switch that distributes a portion of switch logic to the first VM to route packets for the service chain flow between at least the first and second VMs.

7. The apparatus of claim 6, a fourth processing element of the multi-core processor to support a host operating system having a virtual switch control path to communicate distribution of the portion of switch logic to the first VM to configure the virtual switch.

8. The apparatus of claim 1, comprising a digital display coupled to the multi-core processor to present a user interface view.

9. At least one machine readable medium comprising a plurality of instructions that in response to being executed by a first virtual machine (VM) supported by a first processing element of a multi-core processor cause the first VM to:
  receive a packet for a service chain flow that is to be processed by a first application executed by the first VM supported by the first processing element of the multi-core processor;
  access a first flow table from among a plurality of flow tables;
  use the first flow table to route the packet following service chain processing by the first application to a second VM supported by a second processing element of the multi-core processor for additional service chain processing by a second application executed by the second VM; and
  send a message to the second VM that includes a first reference to a first location in a memory shared between the first and second VMs for the second VM to receive the packet, the memory shared between the first and second VMs comprising a shared memory ring producing a shared memory mesh capable of allowing the first and second VMs to receive the packet for service chain processing in a zero-copy manner.

10. The at least one machine readable medium of claim 9, the instructions to also cause the first VM to receive the packet from a third VM by receiving a second message that includes a second reference to a second location in the memory shared between the first, second and third VMs.

11. The at least one machine readable medium of claim 10, the first location and the second location are a same memory address for the memory shared between the first, second and third VMs.

12. The at least one machine readable medium of claim 9, the plurality of flow tables are arranged to be indicated as a single flow table to a user that has requested configuration of a virtual switch to route packets for the service chain flow between at least the first and second VMs.

13. The at least one machine readable medium of claim 12, the first flow table from among the plurality of flow tables assigned to the first VM based on a configuration of the virtual switch that distributes a portion of switch logic to the first VM to route packets for the service chain flow between at least the first and second VMs.

14. The at least one machine readable medium of claim 13, a fourth processing element of the multi-core processor to support a host operating system having a virtual switch control path to communicate distribution of the portion of switch logic to the first VM to configure the virtual switch.

15. A method comprising:
  receiving, at a host operating system supported by a first processing elements of a multi-core processor, a request from a requestor, the request to include an indication to configure a virtual switch used to route packets for a service chain flow between first and second virtual machines (VMs) separately supported by respective second and third processing elements of the multi-core processor, configuring the virtual switch including:
    generating a global flow table to indicate a route the packets for the service flow are to follow for processing by separate applications executed by the first and second VMs;
    partitioning the global flow table into first and second flow tables for respective use by the first and second VMs to route the packets for the service chain flow following separate processing by the separate applications;
    indicating the first and second flow tables to the first and second VMs; and
    providing only the global flow table to the requestor to indicate configuration of the virtual switch, the global flow table arranged to be maintained in a first memory, indicating the first flow table to the first VM includes providing a first memory address range of the first memory that maintains the first flow table, indicating the second flow table to the second VM includes providing a second memory address range of the memory that maintains the second flow table.

16. The method of claim 15, the host operating system having a virtual switch control path with the first and second VMs to indicate the first and second flow tables to the first and second VMs.

17. At least one machine readable medium comprising a plurality of instructions that in response to being executed by a host operating system supported by a first processing element of a multi-core processor cause the host operating system to:
  receive a request from a requestor, the request to include an indication to configure a virtual switch used to route packets for a service chain flow between first and second virtual machines (VMs) separately supported by respective second and third processing elements of the multi-core processor, configuring the virtual switch to include the instructions to cause the operating system to:
    generate a global flow table to indicate a route the packets for the service flow are to follow for processing by separate applications executed by the first and second VMs;
    partition the global flow table into first and second flow tables for respective use by the first and second VMs to route the packets for the service chain flow following separate processing by the separate applications; and indicate the first and second flow tables to the first and second VMs; and provide only the global flow table to the requestor to indicate configuration of the virtual switch, the global flow table arranged to be maintained in a first memory, the instructions to further cause the host operating system to indicate the first flow table to the first VM by providing a first memory address range of the first memory that maintains the first flow table and indicate the second flow table to the second VM by providing a second memory address range of the memory that maintains the second flow table.

18. The at least one machine readable medium of claim 17, the host operating system having a virtual switch control path with the first and second VMs, the instructions to further cause the host operating system to indicate the first and second flow tables to the first and second VMs through the virtual control path.

19. The at least one machine readable medium of claim 17, the first VM and the second VM capable or routing the packets for the service flow in a zero-copy manner that includes the first VM sending a message to the second VM that includes a reference to a location in a second memory shared between the first and second VMs that allows the first VM to route the packets without copying.

20. The at least one machine readable medium of claim 19, the second memory comprising a shared memory ring producing a shared memory mesh.

21. The at least one machine readable medium of claim 17, the service chain flow is for an e-mail service chain, a streaming video service chain, a streaming audio service chain, a service provider service chain, a network storage service chain, a social network service chain or a network security service chain.

* * * * *